United States Patent [19]

Tamaru et al.

[11] E Re. 30,588

[45] Reissued Apr. 21, 1981

[54] ELECTRIC TIMEPIECE FOR DISPLAYING THE OPERATING CONDITION THEREOF

[75] Inventors: Munetaka Tamaru, Tokyo; Kazunari Kume, Tokorozawa; Hideshi Oono, Sayama; Minoru Watanabe, Tokorozawa; Hideo Sato, Sayama; Shigeru Morokawa, Higashiyamato, all of Japan

[73] Assignee: Citizen Watch Co. Ltd., Tokyo, Japan

[21] Appl. No.: 969,577

[22] Filed: Dec. 14, 1978

Related U.S. Patent Documents

Reissue of:

[64] Patent No.: 3,998,043
Issued: Dec. 21, 1976
Appl. No.: 526,980
Filed: Nov. 25, 1974

[30] Foreign Application Priority Data

Dec. 26, 1973 [JP] Japan ..... 49-3258
Feb. 26, 1974 [JP] Japan ..... 49-22537

[51] Int. Cl.[3] ..... G04B 9/00

[52] U.S. Cl. ..... 368/66; 368/203; 368/204

[58] Field of Search ..... 58/85.5, 50 R, 28 R, 58/23 A, 23 R, 23 BA; 368/66, 203, 204

[56] References Cited

U.S. PATENT DOCUMENTS

| | | | |
|---|---|---|---|
| 3,451,210 | 6/1969 | Helterline, Jr. et al. | 58/28 R |
| 3,540,207 | 11/1970 | Keeler | 58/23 R |
| 3,553,957 | 1/1971 | Dome et al. | 58/23 A |
| 3,568,430 | 3/1971 | Walton | 58/23 R |
| 3,591,957 | 7/1971 | Cobarg | 58/23 R X |
| 3,665,703 | 5/1972 | Cobarg | 58/23 BA X |
| 3,668,861 | 6/1972 | Mitsui | 58/50 R |
| 3,802,182 | 4/1974 | Fujita | 58/23 BA X |
| 3,807,164 | 4/1974 | Zaisky et al. | 58/28 R |
| 3,841,087 | 10/1974 | Kikuchi | 58/23 R X |
| 3,898,790 | 8/1975 | Takamune et al. | 58/23 BA |
| 4,014,164 | 3/1977 | Fujita | 58/23 BA |

*Primary Examiner*—Ulysses Weldon
*Attorney, Agent, or Firm*—Sherman & Shalloway

[57] ABSTRACT

In a battery operated electric timepiece operated by a battery of the type including a time display, such as a second hand, when the voltage of the battery decreases below a predetermined value, the movement of the second hand is modified to give an alarm that the life of the battery has terminated.

9 Claims, 9 Drawing Figures

ELECTRIC TIMEPIECE FOR DISPLAYING THE OPERATING CONDITION THEREOF

Matter enclosed in heavy brackets [ ] appears in the original patent but forms no part of this reissue specification; matter printed in italics indicates the additions made by reissue.

BACKGROUND OF THE INVENTION

This invention relates to an electric timepiece and, more particularly an electric timepiece which displays not only the time but also termination of the life of the battery used to drive the timepiece, as environmental condition such as temperature, humidity or other conditions of the timepiece.

The most serious problem encountered in an electric timepiece driven by a battery is the termination of the life of the battery. As the end of the battery's life is approached, the voltage of the battery decreases thus causing inaccurate operation, and when the life ends or is terminated, the operation of the timepiece stops. According to a prior art method of alarming indicating the termination of the life of the battery a luminous element having a predetermined operating voltage is provided and the luminous element is intermittently flashed by means of a clock pulse several days before termination of the battery life, the voltage of the battery decreases below the operating voltage of the luminous element thus preventing its operation. According to another method, the luminous element is normally maintained inoperative but caused to intermittently flash when the voltage of the battery decreases below a predetermined value. Accordingly, since the luminous element constantly flashes, the power consumption is large consequently, it is necessary to use a battery having larger capacity. Power consumption is thereby increased when the end of the battery's life is approached thus accelerating exhaustion of the battery.

SUMMARY OF THE INVENTION

Accordingly, it is an object of this invention to provide an improved electric timepiece wherein time display means of the timepiece, such as a second hand of the timepiece, for example, is also used to display operating conditions of the timepiece such conditions as the terminal voltage of a battery utilized to operate the timepiece, the temperature or humidity condition inside the timepiece are displayed by the second hand, thus obviating use of additional display means for the operating conditions. Thus, for example, the second hand is normally stepped once for each second as in conventional timepieces but where the terminal voltage of the battery decreases below a predetermined value or the temperature or humidity inside the timepiece increases beyond a predetermined value, the movement of the second hand is modified to give an alarm to the user. For example, the movement of the second hand may be modified so that it is moved quickly through two second sections of the dial plate and then held stationary for two seconds. Such irregular movement of the second hand gives an alarm to the user which indicates that a condition within the watch is amiss.

Accordingly, it is another object of this invention to provide a novel circuit for causing such irregular movement of the time display member of the timepiece.

A further object of this invention is to provide a novel alarming and display device for a battery operated timepiece which continuously displays impending termination of the life of the battery.

BRIEF DESCRIPTION OF THE DRAWINGS

Further object and advantages of the invention can be more fully understood from the following detailed description taken in conjunction with the accompanying drawings in which.

DESCRIPTION OF THE PREFERRED EMBODIMENTS

Figure 1:
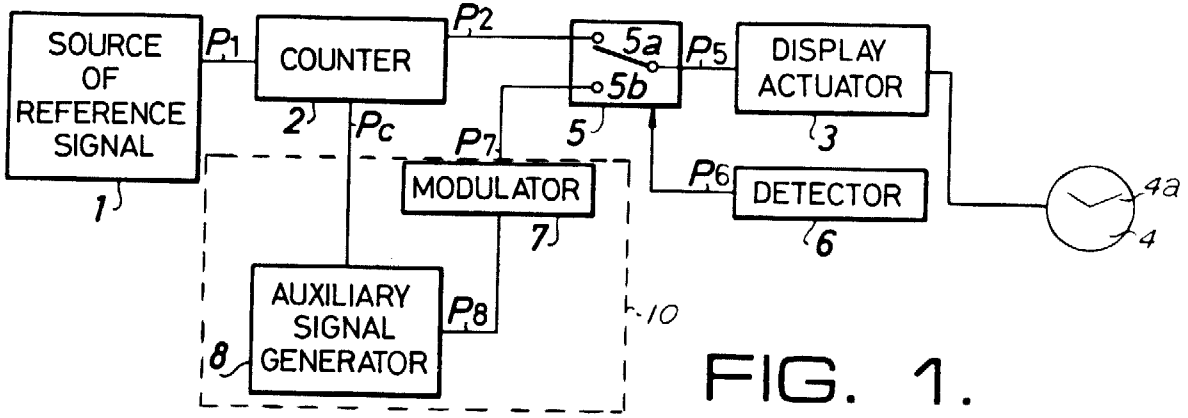
FIG. 1 is a block diagram of an electric timepiece embodying the invention.

A preferred embodiment of this invention shown in FIG. 1 comprises a source of reference signal 1, a counter 2 for counting the number of reference signals, a transfer switch 5, *and a circuit means 10 composed of* an auxiliary signal generator connected to an intermediate stage of the counter 2, and *of* a modulator 7 connected to the output of the auxiliary signal generator 8. The outputs of the counter 2 and the modulator 7 are connected to the stationary contacts 5a and 5b, respectively of the transfer switch 5[,]. There is also provided a detector 6 with its output connected with the transfer switch 5, a display actuator 3 connected to the transfer switch 5 and a display device 4 *provided with at least a single hand 4a and* actuated by the display actuator 3.

Figure 2:
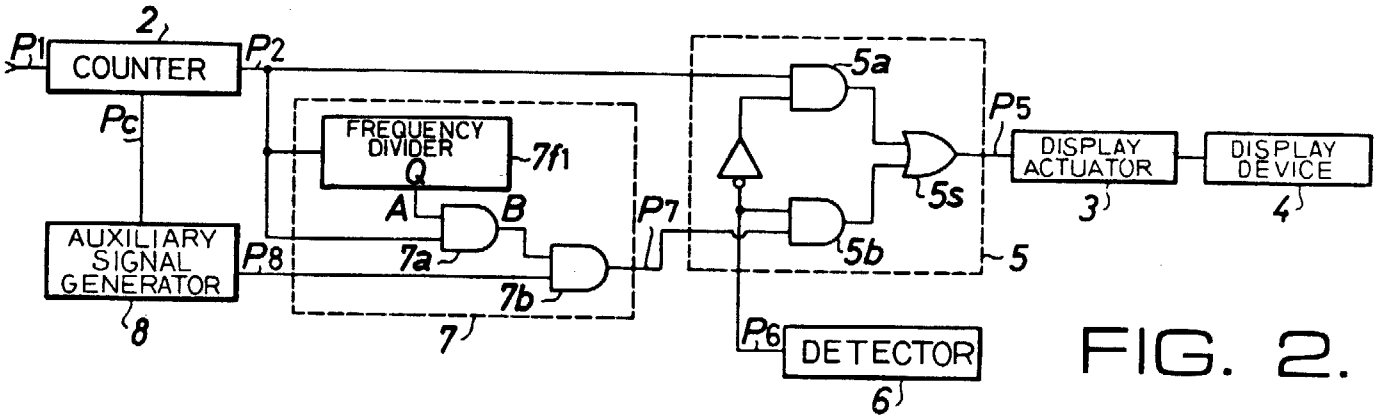
FIG. 2 shows details of the electrical circuitry of the timepiece shown in FIG. 1.
Figure 3:
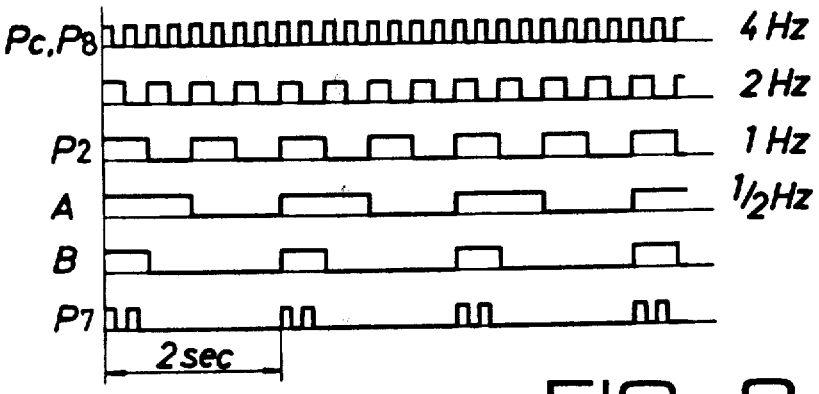
FIG. 3 shows the waveforms of various portions of the circuit shown in FIG. 4.

As a practical example of the timepiece described above, a crystal timepiece driven by a step motor and provided with an alarm for the termination of the battery life will be considered. The circuitry for the transfer switch 5 and modulator 7 are shown in FIG. 2 and the waveform of various portions of the circuit shown in FIG. 2 is illustrated in FIG. 3.

In operation, source of reference signals 1 including an oscillation circuit excited by a crystal oscillator, not shown, generates a reference signal $P_1$. The frequency of signal $P_1$ is divided by counter 2 which includes a frequency divider and the output $P_2$ from the counter 2 is applied to a switching element 5a comprising an AND gate circuit. Normally, the signal $P_2$ is determined by the type of the stepping motor. If desired, a wave shaping means may be provided for the counter 2 or the display actuator 3 which cooperates with the counter for determining the width, polarity and frequency of the pulse. For the purpose of description, it is assumed herein that signal $P_2$ is a unidirectional pulse having a frequency of 1 Hz which is suitable for driving the stepping motor.

The modulator 7 is supplied with signal $P_2$ and converts this signal into a signal A having a frequency of ½ Hz by means of a frequency divider $7f_1$. Signals A and $P_2$ are applied to an AND gate circuit 7a to form a signal B having a pulse width of ¼ and a frequency of ½ Hz.

A signal Pc having a frequency of 4 Hz is derived out from an intermediate stage of the counter 2 which is applied to the auxiliary signal generator 8 to form a signal $P_7$. This signal is applied to an AND gate circuit 7b together with a signal B having a frequency of ½ Hz and a pulse width of ¼, thus forming a signal $P_7$ which comprises two pulses having a frequency of 4 Hz which are generated every two seconds. The signal $P_7$ is applied to the switching element 5b of the transfer switch 5 comprising an AND gate circuit.

Detector 6 produces a signal $P_6$ in response to the voltage of the battery, (not shown). Signal $P_6$ identifies the battery voltage higher than 1.3 V as an L level whereas identifies the battery voltage lower than 1.3 V as a H level. Thus, where the battery voltage is higher than 1.3 V, signal $P_6$ is at L level, and this signal functions as an H level for switch element 5a whereas as a L level for switch element 5b with the result that the signal $P_5$ on the output side of an OR gate circuit 5s is equal to signal $P_2$. Accordingly, the display device 4 driven by the display actuator 3 is actuated in accordance with signal $P_2$. Thus, the second hand of the timepiece is stepped at each one second interval which corresponds to the normal operation of the timepiece.

The detector 6 detects the fact that the voltage of the battery has decreased below 1.3 V and changes signal $P_6$ to H level. The signal $P_6$ functions at L level for switch element 5a but at H level for switch element 5b with the result that signal $P_5$ that appears on the output side of the OR gate circuit is equal to signal $P_7$. As a result, the movement of the hands is governed by signal $P_7$ so that the second hand quickly advances a section of the scale corresponding to 2 seconds, and stops for two seconds. This cycle of movement is repeated. It is desirable to accurately maintain the interval of 2 seconds.

In this manner, by the operation of the detector, the normal movement of the second hand is modified into intermittent movements of two seconds interval, thereby alarming the user that he should renew the battery.

Figure 5:
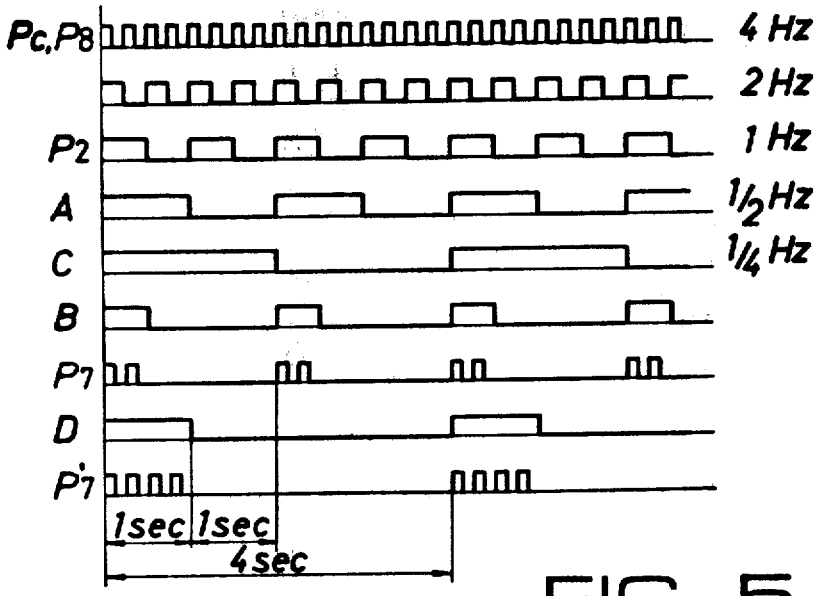
FIG. 5 shows the waveforms of various portions of the circuit shown in FIG. 4.
Figure 4:
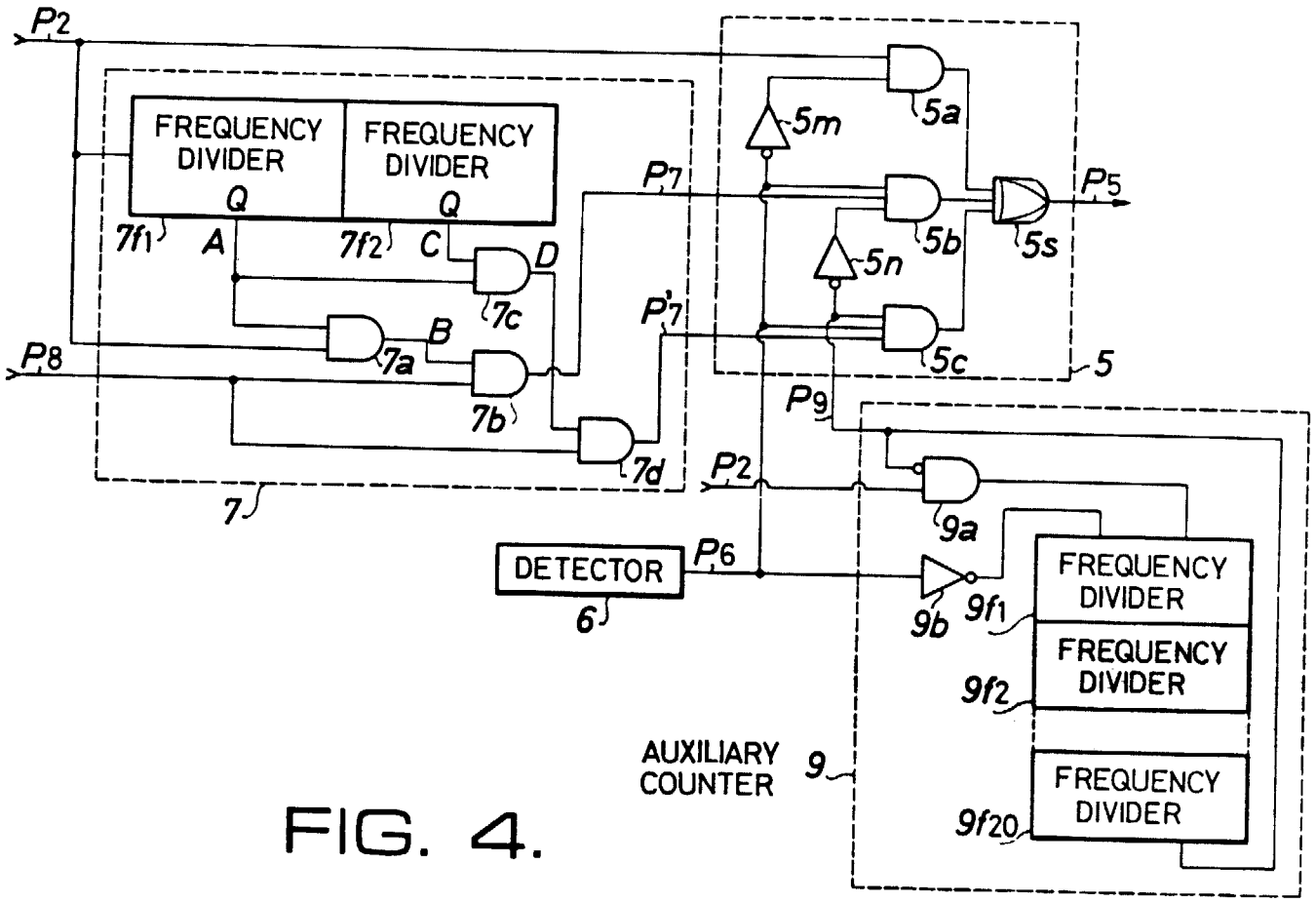
FIG. 4 shows an electric circuit of a modified embodiment of this invention.

FIG. 4 shows another embodiment of this invention and FIG. 5 shows waveforms at various portions of the circuit shown in FIG. 4. The embodiment shown in FIG. 4 is different from that shown in FIG. 2 in that a frequency divider $7f_2$, an AND gate circuit 7c and 7d are added to the modulator 7, that an auxiliary counter 9 is added, and that a switch element 5c in the form of an AND gate circuit is added to the transfer swtich 5.

The device of this embodiment operates as follows. The waveforms showing the operation of the modulator 7 are shown in FIG. 5. Signals A, B, and $P_7$ shown therein are identical to those shown in FIG. 3. Signal $P'_7$ is formed in the following manner. Signal C produced by frequency divider $7f_2$ connected to frequency divider $7f_1$ has a frequency of ¼ Hz and signal C is applied to AND gate circuit 7c together with signal A for producing signal D having a frequency of ¼ Hz and a pulse width of ¼. Further, signal D and signal $P_8$ are applied to the inputs of an AND gate circuit 7d for producing signal $P'_7$ comprising 4 pulses of 4 Hz recurring at a period of 4 seconds as shown in FIG. 5. This signal $P'_7$ is applied to switch element 5c in the form of an AND gate circuit. As is shown in FIG. 3 and FIG. 5, the pulse trains $P_7$ and $P'_7$ have n pulses, which occur during a first portion of a cycle, which is n seconds in duration. In FIG. 3, n is the integer 2 and in FIG. 5, n is the integer 4.

The purpose of the auxiliary counter 9 is to count the period after operation of the detector 6. The auxiliary counter 9 comprises an inverter 9b, an AND gate circuit 9a and frequency dividers $9f_1$, $9f_2$, . . . $9f_{20}$. Signal $P_6$ is applied to frequency dividers $9f_1$ through $9f_{20}$ via inverter 9b. But as signal $P_6$ is normally at L level, these frequency dividers are reset. However, as signal $P_9$ is also normally at L level and AND gate circuit 9a is enabled frequency dividers $9f_1$ through $9f_{20}$ would not operate. When signal $P_6$ turns to H level, frequency dividers $9f_1$ through $9f_{20}$ are reset, thus commencing the counting operation. Since the counting operation is performed by signal $P_2$ having a frequency of 1 Hz, after $20^{20}$ seconds (about 12 days), the signal $P_9$ applied to frequency divider $f_{20}$ changes to H level thereby disenabling the AND gate circuit 9a. As a result, signal $P_9$ will be maintained at H level. Signal $P_2$ and signal $\overline{P}_6$ (signal $P_6$ inverted by an inverter 5m) are applied to the switching element 5a of the transfer switch 5, signals $p_7$, $P_6$ and $\overline{P}_9$ (signal $P_9$ inverted by inverter 5n) are applied to switching element 5b, and signals $p'_7$, $P_6$ and $P_9$ are applied to switching element 5c. Consequently, signal $P_5$ on the output side of OR gate circuit 5s depends on signal $P_6$. Thus, when signal $p_6$ is at L level, the switching element 5a is enabled to pass signal $P_2$. On the other hand, when signal $P_6$ turns to H level the auxiliary counter 9 begins to operate. Further, the switching element 5b is enabled to pass signal $P_7$. At about 12 days after the auxiliary counter 9 has started to count, signal $P_9$ changes to H level so that the switching element 5c is enabled thus [coverting] *converting* signal $P'_7$ into signal $P_5$ through an OR gate circuit 5s. Accordingly, so long as the voltage of the battery is higher than 1.3 V, the second hand moves normally, that is, one step per second, whereas when the voltage drops below 1.3 V, the second hand will quickly move two steps (a scale section corresponding to 2 seconds) and stands still for 2 seconds, thus alarming the user that the life of the battery has exhausted. After about 12 days thereafter, the second hand will quickly move four steps (a scale section corresponding to 4 seconds) and stands still for 4 seconds, thus alarming that the operation of the timepiece will soon stop. Although in the foregoing description, the construction and operation of the auxiliary signal generator have not been described, it should be understood that where signal $P_8$ applied to modulator 7 is not equal to signal Pc, the auxiliary signal generator 8 operates to form the required signal $P_8$.

Although foregoing embodiment shows an application of this invention to a mechanical crystal timepiece it will be clear that the invention can also be applied to a digital crystal timepiece. In any case, the time may be displayed in terms of seconds, minutes, hours, weeks, days and months or any combination thereof, and it is generally desirable to display the time of illuminating suitable lamps or luminous elements. For example, for alarming termination of the life of the battery, while the voltage is still higher than 1.3 V, the display of minutes may be performed by a normally lighted lamp, whereas when the voltage decreases below 1.3 V, the lamp is flashed intermittently. Further, in the embodiment shown in FIG. 4, when the end point of the life of the battery approaches, not only the minute display lamps but also the hour display lamps are flashed. Of course, such alarm may be made by using any display lamps other than minute and hour display lamps.

In addition to the alarming of the termination of the battery life, it is also possible to display or alarm other conditions as follows described in the following. All display means are not required to be modifiable, but if necessary additional display means may be provided.

These are only few examples, and many other applications may be made. If necessary, any one of conventional display means may be modified. Such detecting means can also be used for other purposes.

Instead of utilizing a crystal oscillator as the source of reference signal other source of oscillation or vibration such as a tuning fork or a sound piece may be used as the source of reference signal. Further, instead of utilizing above-described methods of modulation, other method of modulation or modification may be used. For example, a phase modulation as shown in FIG. 2 may be used where the second hand is quickly advanced for two second intervals and stopped for two seconds, or where LED elements, for example, are used to display hours, frequency modulation may be used for varying the frequency of hour displays. Furthermore, amplitude modulation for varying the contrast of the display, or sequence modulation for changing the order of display, or any combination of various modulations described above may be used.

As described hereinabove, the invention provides a novel timepiece provided with a time display means which is controlled by detecting means, modulating means and switching means, so that it is possible to use the time display means to also display other conditions of the timepiece without providing other display means.

Figure 6:
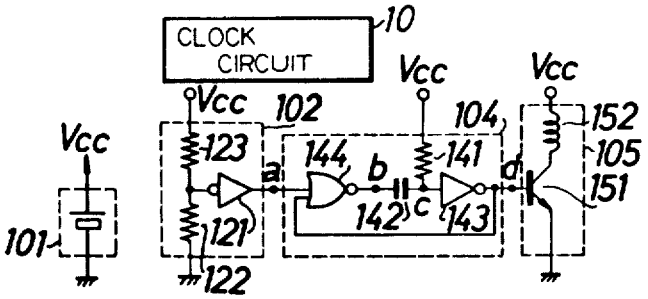
FIG. 6 is a connection diagram of a modified embodiment of this invention provided with an alarming and display device.
Figure 8:
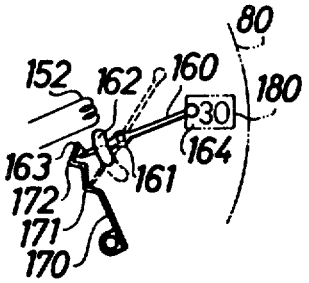
FIG. 8 is a partial view of the alarming and display device utilized in the circuit shown in FIG. 6.

FIGS. 6 and 8 show a modified embodiment of this invention provided with an alarming member having a memory characteristic. A battery 101 is used to operate a clock circuit 103 and an alarming circuit to be described hereunder. A voltage detection circuit 102 (such as the detectors 6 of FIGS. 1 and 4) is connected across the battery and comprises serially connected resistors 122 and 123 and an inverter 121. The output of the inverter 121 is applied to a single pulse generator 104 comprising a resistor 141 which is connected to one pole of the battery, capacitor 142, an inverter 143 and a NOT gate circuit 14, which are connected as shown. One input of the NOT gate circuit 144 is connected to the output of inverter 121 and the other input of the NOT gate circuit 144 is connected to the output of inverter 143. The drive circuit 105 of an alarming and display device (to be described later) comprises a transistor 141 having a base electrode connected to the output of the inverter 143 and as emitter electrode grounded, and a coil 152 connected to the collector electrode of transistor 151.

Figure 7:
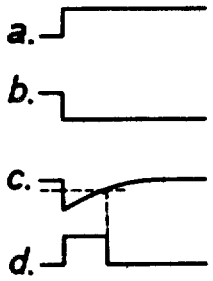
FIG. 7 shows voltage waveforms at various points of the circuit shown in FIG. 6.

The alarming circuit shown in FIG. 6 operates as follows. Resistors 122 and 123 are selected such that the voltage derived out from their juncture is slightly higher than the threshold voltage of the inverter 121 under normal voltage condition of the battery so that the voltage at point a will be at a L (low) level. Under these conditions, the voltage at the output d of inverter of the single pulse generator 104 is also at the L level and point b on the output of NOT gate circuit 144 is at a H (high) level with the result that capacitor 142 is discharged, and the transistor 151 is turned off to deenergize coil 152. As the voltage of battery 101 decreases, the voltage at the juncture of resistors 122 and 123 becomes lower than the threshold voltage of the inverter 121, the voltage at point a becomes the H level, whereas the voltage at point b becomes the L level as shown in FIG. 7, thus commencing to charge capacitor 142 through resistor 141. At the same time when the voltage of point b reaches the L level, the voltage of point c also reaches the L level whereas the potential of point d reaches the H level. Consequently, the transistor 151 is turned ON to pass current through coil 152. As the voltage point c reaches the threshold voltage of the inverter 143 as a result of charging capacitor 142, the voltage at point d reaches the L level with the result that the transistor 151 is turned OFF thus deenergizing coils 152.

FIG. 8 shows the alarming and display device driven by coil 152 and having a memory function. The alarming and display device comprises a lever 160 having an opening 161 for receiving a spindle (not shown) journal led by a base plate (not shown), a permanent magnet 162 cooperating with the coil 152, a positioning arm 163 and a display member 164. The arm 163 cooperates with a leaf spring 170 secured to the base plate and provided with two recesses 171 and 172 which cooperate with the arm 163. Reference numeral 80 shows a dial plate of the timepiece provided with a window 180 for viewing from outside the display member 164. In this embodiment, window 180 is also used to display a calendar (days of the week, month, etc.). This construction not only simplifies the construction of the dial plate 80 but also improves appearance.

In operation, so long as the voltage of the battery is higher than a predetermined value, the lever 160 is held at the position shown by dotted lines with its arm 163 received in the first recess 171 of the leaf spring 170. Under these conditions, the display member 164 is not seen through window 180. As the life of the battery approaches its end, coil 152 is energized in the manner described above to attract the permanent magnent 162. Consequently, the arm 163 is moved to the second recess 172 by snap action whereby the display member 164 is brought into alignment with window 180 thus indicating the termination of the battery life. When the battery is exchanged with a new one, the arm 160 is returned to the original position thus causing arm 163 to engage the first recess 171.

Figure 9:
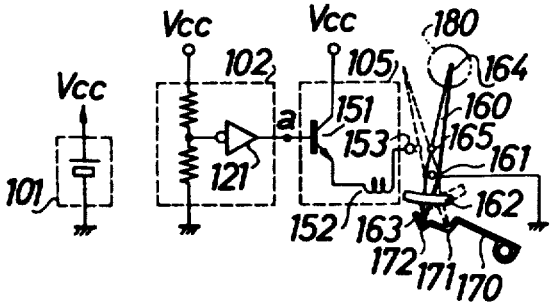
FIG. 9 shows a modification of the embodiment shown in FIG. 6.

FIG. 9 shows still another embodiment of this invention, wherein the battery 101, the voltage detection circuit 102 (which is similar to the detectors 6 of FIGS. 1 and 4) and the leaf spring 170 are identical with those shown in FIGS. 6 and 8. However, coil 152 of the drive circuit 105 is connected in series with the emitter electrode of transistor 151 having a base electrode directly coupled to the output of inverter 121. The free terminal 153 of coil 152 is disposed to cooperate with a contact 165 carried by lever 160. In this embodiment, the pulse generator 104 shown in FIG. 6 has been omitted and the lever 160 and the leaf spring 170 have the same construction as those shown in FIG. 8.

In operation, under the normal voltage condition of the battery, the voltage at point a is at the L level so that transistor 151 is OFF and no current flows through coil 152 with the result that the lever 160 is held in the dotted line position. As the battery voltage decreases the voltage at point a reaches the H level thus turning ON transistor 151. Consequently, the coil 152 is energized through contacts 153 and 165 to attract the permanent magnet 162 thereby snapping arm 163 into the second recess 172. As a result the display member 164 is brought into alignment with window 184. At the same time contacts 153 and 165 are opened to deenergize coil 152. Thereafter, the display member 164 is maintained in window 164 thereby providing a type of memory function or semi permanent indication.

The following is a table showing the relationship between the capacity of the battery (about 150 mA.H.) and the alarming period.

| | Battery Capacity: about 150 mA.H Load: 100 KΩ | |
|---|---|---|
| | Voltage(V) | Period (days) |
| Normal | 1.56 | over 360 |
| | 1.50 | 15 |
| | 1.40 | 7 |
| Low | 1.30 | 5 |

If the voltage detecting circuit can detect a voltage difference of about 50 mV, as the battery voltage decreases to about 1.4 V, the timepiece is capable of operating further for an alarming period of about 7 days or more.

Instead of using a mechanical alarming and display device it is also possible to use an electrooptical element such as an electric element which changes its colour or brightness by applying an electric field or current for a short time and preserving such changed colour or brightness.

Even when the alarming device of this invention is incorporated, the power consumption of the timepiece does not increase appreciably. Moreover, as the calendar window is used for the alarming and display, the appearance of the timepiece will not be changed.

What is claimed is:

1. In an electronic timepiece, which includes a battery means for producing a voltage of a predetermined level to drive a customary time display and associated circuitry for transmitting power at a predetermined frequency from the battery means to the customary display, wherein the associated circuitry includes:

a reference signal souce for producing a divisible signal to drive the customary time display;

a counter for dividing the signal produced by the reference signal source, and for producing the signal of a predetermined frequency to drive said customary time display;

an auxiliary signal generator driven by the counter and having an output signal of a first frequency, different from the predetermined frequency;

a modulator including a frequency divider and a logic circuit, wherein said modulator has first and second inputs from the counter and an input from the auxiliary generator, wherein the first input from the counter is applied through the frequency divider, then to the logic circuit; wherein the second input from the counter is applied to the logic circuit; and wherein the input from the auxiliary signal generator is applied to the logic circuit; wherein the logic circuit generates a signal of a second frequency different from said first frequency;

detecting means for detecting, when the battery means produces a low voltage below said predetermined level, and for producing an alarm signal upon detecting said low voltage; and signal transfer means activated in response to said alarm signal for selecting whether the signal having the predetermined frequency, or the signal having the second frequency will be applied to the display.

2. The electric timepiece of claim 1, wherein the signal transfer means includes an AND gate circuit, and wherein the alarm signal from the detecting means is a switching signal, which causes said transfer means to switch from said signal of the predetermined frequency to said signal of the second frequency.

3. The electric timepiece of claim 1, wherein the modulator generates repeating signals having a cycle, in which n pulses are produced within a time period having a duration of n seconds, wherein the n pulses occur during a first portion of each time period.

4. The electric timepiece of claim 2, wherein the modulator generates repeating signals having a cycle, in which n pulses are produced within a time period having a duration of n seconds, wherein the n pulses occur during a first portion of each time period.

5. The electric timepiece of claim 1, wherein the associate circuitry further includes an auxiliary counter, which receives signals from said counter and said detecting means, said auxiliary counter generating a third signal of a third frequency different from that of said modulator, and supplying the third signal to said signal transfer means to provide the signal transfer means with a third frequency for application to the signal transfer means.

6. The electronic timepiece of claim 1, wherein the logic circuit includes first and second AND gates, wherein the first AND gate has an input from the frequency divider, an input having the predetermined frequency from the counter and an output, which is the product of the inputs; and wherein the second AND gate has an input, which is the output of the first AND gate and an input, which is the output of said auxiliary signal generator, wherein the output of the second AND gate is the signal of the second frequency.

*7. An electronic timepiece powered by battery means, comprising:*

*a source for producing a reference signal having a relatively high frequency;*

*means for dividing said reference signal to produce a relatively low frequency signal and a time unit signal of a predetermined frequency;*

*a display device having at least one hand adapted to display time;*

*a display actuator responsive to said time unit signal to produce a first drive signal of said predetermined frequency to actuate said display device in a customary mode;*

*a detector for detecting an output voltage of said battery means to generate a detection signal when said output voltage decreases below a predetermined level;*

*circuit means for generating a modulation signal of a second frequency different from said predetermined frequency in response to said relatively low frequency signal;*

*signal transfer means responsive to said detection signal for inhibiting said time unit signal being applied to said display actuator and for allowing said modulation signal to pass therethrough to said display actuator;*

*said display actuator being responsive to said modulation signal to produce a second drive signal of said second frequency whereby said hand is driven in a mode different from said customary mode to indicate an end of life of said battery means;*

*said display device further comprising a stepping motor which is driven by said display actuator; and*

*said circuit means comprising a modulator which is responsive to said relatively low frequency signal to produce said modulation signal.*

*8. An electronic timepiece of claim 7, wherein said circuit means also comprises an auxiliary signal generator having an input supplied with said relatively low frequency signal for producing an auxiliary signal, said modulator being responsive to said auxiliary signal to provide said modulation signal.*

*9. An electronic timepiece of claim 7, in which said circuit means comprises means for producing an additional modulation signal of a third frequency different from said second frequency, and further comprising means for generating an output signal at a predetermined time instant after said detection signal has been produced, said signal transfer means being responsive to said output signal to pass said additional modulation signal to said display actuator, whereby said display actuator actuates the hand of said display device in a second mode to indicate a second end of life of said battery means.*

* * * * *